(12) United States Patent
Felton

(10) Patent No.: US 8,707,056 B2
(45) Date of Patent: Apr. 22, 2014

(54) SECURITY PROVISION FOR A SUBJECT IMAGE DISPLAYED IN A NON-SECURE DOMAIN

(75) Inventor: Donald Felton, Ely (GB)

(73) Assignee: ARM Limited, Cambridge (GB)

( * ) Notice: Subject to any disclaimer, the term of this patent is extended or adjusted under 35 U.S.C. 154(b) by 313 days.

(21) Appl. No.: 13/137,904

(22) Filed: Sep. 21, 2011

(65) Prior Publication Data

US 2012/0102557 A1    Apr. 26, 2012

(30) Foreign Application Priority Data

Oct. 21, 2010 (GB) .................................... 1017785.5

(51) Int. Cl.
| | | |
|---|---|---|
| G06F 12/14 | (2006.01) | |
| G06F 21/64 | (2013.01) | |
| G06F 21/50 | (2013.01) | |

(52) U.S. Cl.
CPC ................ *G06F 21/64* (2013.01); *G06F 21/50* (2013.01)
USPC ................ 713/193; 713/189; 726/26; 726/30

(58) Field of Classification Search
None
See application file for complete search history.

(56) References Cited

U.S. PATENT DOCUMENTS

| 6,279,057 | B1 * | 8/2001 | Westby ............................ 710/52 |
|---|---|---|---|
| 7,007,304 | B1 | 2/2006 | Girard et al. |
| 7,302,585 | B1 | 11/2007 | Proudler et al. |
| 7,509,502 | B2 | 3/2009 | Francis et al. |
| 8,134,596 | B2 * | 3/2012 | Lei et al. ........................ 348/169 |
| 2004/0123118 | A1 | 6/2004 | Dahan et al. |
| 2005/0166064 | A1 | 7/2005 | Dive-Reclus et al. |
| 2007/0046680 | A1 * | 3/2007 | Hedrick et al. ............... 345/503 |
| 2008/0163368 | A1 | 7/2008 | Harris et al. |
| 2009/0254986 | A1 | 10/2009 | Harris et al. |

OTHER PUBLICATIONS

GB Application No. 1017785.5.
International Search Report for GB 1017785.5 mailed.
Implementing Cryptography on TFT Technology for Secure Display Applications, Petros Oikonomakos, Jacques Fournier and Simon Moore, University of Cambridge, Computer Laboratory, Cambridge, United Kingdom.
Secure Display and Secure Transactions Using a Handset, Sandeep Singh Ghotra, Baldev Kumar Mandhan, Sam Shang Chun Wei, Yi Song, Chris Steketee, School of Computer and Information Science, University of South Australia, Sixth International Conference on the Management of Mobile Business, 2007 IEEE.

* cited by examiner

Primary Examiner — Matthew Henning
(74) Attorney, Agent, or Firm — Nixon & Vanderhye P.C.

(57) ABSTRACT

A data processing device is provided with a processor core 8 that can operate in either a secure domain or a non-secure domain. Data stored within a secure region 34 of a memory 10 can only be accessed when the processor core 8 is executing in the secure domain. A frame buffer 36 for storing a display image 20 to be displayed is stored within a non-secure region of memory which can be accessed by the processor core 8 irrespective of whether it is in the secure domain or the non-secure domain as well as a display controller 12. When a subject image 22 is written to the frame buffer 36, validation data for the subject image 22 is stored within the secure region 34. When a user input is received the displayed data stored at a validated display area to which the subject image was written is read back and used to generate check data with is compared with the validation data before the user input is authenticated.

23 Claims, 3 Drawing Sheets

US 8,707,056 B2

SECURITY PROVISION FOR A SUBJECT IMAGE DISPLAYED IN A NON-SECURE DOMAIN

BACKGROUND OF THE INVENTION

1. Field of the Invention

This application claims priority to GB Application No. 1017785.5 filed 21 Oct. 2010, the entire contents of which are incorporated herein by reference.

This invention relates to the field of data processing systems. More particularly, this invention relates to securing display of a subject image within a data processing system supporting both a secure domain and a non-secure domain.

2. Description of the Prior Art

It is known to provide data processing systems, such as the processors including TrustZone technology designed by ARM Limited of Cambridge, England, which provide both a secure domain and a non-secure domain. When a processor is operating in the secure domain it can access data stored within both secure regions of memory and non-secure regions of memory whereas when the processor is operating in the non-secure domain it can access data stored within the non-secure regions but is not able to access data stored within the secure regions. It is known within such systems to display images to prompt a user to provide user input. As an example, a system may display a subject image prompting a user to enter a person identification number (PIN) or a password in order to authenticate a transaction the details of which are represented in the subject image, e.g. the secure image may represent the cost of a transaction and recipient of the funds relating to a transaction, with the user being prompted to enter their PIN in order to authenticate the transaction and authorise the funds transfer.

Within such systems a potential security vulnerability is that the display of the subject image may be compromised such that a user is presented with an image specifying different details, e.g. amount of transaction, recipient details, and be prompted to enter their PIN to authorise a transaction which then takes place with other parameters, such as a higher amount or a different recipient. A problem in addressing this security vulnerability is that although special purpose hardware for secure display is known from U.S. Pat. No. 7,509,502 (Secure LCD Controller and Frame Store), many widely available data processing systems do not have mechanisms to restrict access to the one or more frame buffers for driving the display to software executing in the secure domain or in another trusted manner. The lack of mechanisms for providing a secure frame buffer or secure frame buffers opens the possibility of a user being shown a manipulated image representing transaction details different to those which will be authorised by their user input.

SUMMARY OF THE INVENTION

Viewed from one aspect the present invention provides an apparatus for processing data comprising:

processing circuitry configured to operate in a selectable one of a secure domain and a non-secure domain;

a memory coupled to said processing circuitry and configured to store secure data within a secure region of said memory and to store non-secure data within a non-secure region of said memory, said secure data being accessible to said processing circuitry when operating in said secure domain and being non-accessible to said processing circuitry when operating in said non-secure domain, and said non-secure data being accessible to said processing circuitry when operating in said secure domain and being accessible to said processing circuitry when operating in said non-secure domain;

a user input device coupled to said processing circuitry and configured to receive user input data; and a display coupled to said processing circuitry and configured to display a display image in dependence upon a frame of image data read from a frame buffer stored within said non-secure region; wherein said processing circuitry is configured to operate in said secure domain to store a subject image comprising at least a portion of said frame of image data within a validated display area of said frame buffer and to store within said secure region validation data dependent upon said subject image; and said processing circuitry is configured to operate in said secure domain to receive a user input from said user input device and, upon receipt of said user input, to read displayed data stored within said validated display area and to compare check data dependent upon said displayed data with said validation data to confirm said displayed data matches said subject image.

The present technique provides a mechanism whereby the subject image is written to the frame buffer stored within the non-secure domain with the secure domain storing validation data that is used upon receipt of a user input to validate that displayed data read from the frame buffer at the location (validated display area) where the subject image was written by confirming this matches the subject image that was initially written to that validated display area. Thus, if the display data within the validated display area is altered after the subject image is written to that validated display area, then the check data will not match the validation data when the user input is received. The technique enables a determination to be made each time a user input is received within the secure domain that the displayed data still matches the subject image and accordingly that the user is responding to the proper subject image and that the displayed data within the validated display area has not been altered inappropriately.

In some embodiments, the user input device may be configured such that when the user generates a user input, if the processing circuitry is operating in the non-secure domain, then the processing circuitry is switched to operating the secure domain without opportunity for a reaction to the user input event by the non-secure domain. This arrangement permits the system to operate in both the non-secure domain and the secure domain whilst awaiting user input, but ensures, if necessary, that the device is switched to the secure domain in order that the validation of the displayed data within the validated display area may be performed from within the secure domain.

This switching upon receipt of user input data may be performed by configuring the processing circuitry such that receipt of the user input data results in the generation of an interrupt signal which triggers execution of interrupt handling code executing within the secure domain.

In other embodiments, it is possible that the processing circuitry may be configured such that when it is operating in a secure domain it polls the user input device to determine if any user input has been received. Thus, the device will not process any user input until it is in the secure domain whereupon it may also validate the display data within the validated display area.

The validation data may be a validation hash value generated by a hash algorithm upon the subject image with the check data being a check hash value generated by the same hash algorithm (or a related hash algorithm) operating upon the displayed data. This has the advantage of reducing the storage requirements for data within the secure domain.

In other embodiments, the validation data may be the subject image itself with a copy of the subject image being stored within the secure domain and directly compared with the displayed data in order to validate that the displayed data matches the subject image.

In many systems a display controller is coupled to the display and to the memory with the display controller being configured to read the frame of image data from the memory and control the display to display the display image in dependence upon the frame of image data. The display controller is typically configured with display configuration data including data specifying a storage location within the memory of the frame buffer and how that data is to be displayed.

Within the context of such systems, security may be improved by providing that the processing circuitry is configured, upon receipt of the user input, to read the display configuration data to confirm that the display configuration data has not changed in an unacceptable manner since the subject image was stored within the validated display area. This provides resistance to an attack which, for example, seeks to modify the image displayed to the user by changing the pointer to the frame buffer whilst relying upon the software within the secure domain to read the original subject image from the location within the memory where it still resides even though it is not being used to drive the display. Permitted changes may be a change in position of a video overlay providing it is not moved on top of the subject image.

Other examples of configuration parameters of the display controller which should be protected in order to prevent unwanted manipulation of the display presented to the user are size parameters of the display image and composition parameters (e.g. layering, window pointers, transparency values etc).

In some embodiments, the apparatus may be connected via a data network to a remote processing apparatus with the remote processing apparatus providing subject image defining data to the apparatus which is to display the subject image with the subject image being derived in dependence upon the subject image defining data. As an example, the subject image defining data may be BMP or PNG data specifying the subject image or more abstract data, such as HTML data, defining a subject image to be composed.

The processing circuitry when operating in the secure domain may transform the subject image defining data received from the remote processing apparatus to generate the subject image in a form matched to the display. Thus, the processing circuitry may adapt generic subject image defining data such that it is rendered in a form particular to the device concerned, e.g. matching the screen size, display resolution, colour capabilities etc.

Security and the ability to audit transactions may be improved if the result of the comparison of the check data with the validation data when a match is found is returned as a match confirmation indication to the remote processing apparatus via the data network. Thus, within the remote processing apparatus a record may be kept that the match was confirmed when the user input was received and accordingly the user was being shown the intended subject image and not some inappropriately changed image.

It is also possible that the subject image may be formed in dependence upon subject image defining data that is stored within the apparatus itself and verified as unmodified by the processing circuitry operating in the secure domain. The subject image may be, for example, dialogue images, such as images eliciting a yes response or a no response, and the confirmation of the correct display of the subject image is desirable to ensure that a user has not been misled into returning a response indicating a yes when in fact they were being displayed an image consistent with their response being a no.

Whilst it will be appreciated that the user input device can take many different forms, such as a mouse, a fingerprint detector, a camera performing face recognition, a camera capturing an image of the user etc, in some embodiments the user input device is a key operated user input device configured to capture keystrokes entered by a user. In this context the processing circuitry may be configured upon capture of each keystroke to read the displayed data stored within the validated display area, to generate the check data dependent upon the display data and to compare the check data with the validation data to confirm that the displayed data matches the subject image.

The key-operated user input device may be configured to generate an interrupt signal on capture of a keystroke to trigger execution of an interrupt handling routine executed within the secure domain. This interrupt handling routine may itself trigger the processing circuitry to perform the checking of the displayed data as described above.

The result of the comparison of the check data with the validation data may trigger a security violation response if a mismatch occurs whereas secure processing operations may proceed when the check data and the validation data match properly.

It will be appreciated that in some embodiments a plurality of frame buffers may be provided, such as systems employing multiple frame buffers relating to a single display, systems employing multiple displays each having their own frame buffer, or systems employing multiple displays each display having multiple frame buffers. The present techniques are applicable to all of these systems and may be used to enhance the security of subject images displayed using one or more of the frame buffers and one or more of the displays.

While the subject image of which the proper display is being protected can take a variety of different forms, in some embodiments the subject image indicates one or more transaction parameters of a transaction to be authenticated and a user input may be an authentication input for authenticating the transaction concerned. The authentication input may be, for example, a personal identification number or password.

Whilst of general applicability within the field of data processing systems, the present techniques have particular utility within data processing systems comprising a mobile data processing apparatus or a set top box configured to receive television signals.

While the subject image could occupy part of the validated display area it is preferred that the subject image completely fills the validated display area so that there is no gap/void region within which image data that could mislead or confuse a user can be displayed net to the subject matter.

Viewed from another aspect the present invention provides an apparatus for processing data comprising:

processing means for performing processing in a selectable one of a secure domain and a non-secure domain;

memory means for storing data, said memory means being coupled to said processing circuitry and configured to store secure data within a secure region of said memory and to store non-secure data within a non-secure region of said memory means, said secure data being accessible to said processing means when operating in said secure domain and being non-accessible to said processing means when operating in said non-secure domain, and said non-secure data being accessible to said processing means when operating in said secure domain and being accessible to said processing means when operating in said non-secure domain;

user input means for receiving a user input data, said user input means being coupled to said processing means; and display means for displaying a display image, said display means being coupled to said processing means and configured to display said display image in dependence upon a frame of image data read from a frame buffer stored within said non-secure region; wherein said processing means is configured to operate in said secure domain to store a subject image comprising at least a portion of said frame of image data within a validated display area of said frame buffer and to store within said secure region validation data dependent upon said subject image; and said processing means is configured to operate in said secure domain to receive a user input from said user input means and, upon receipt of said user input, to read displayed data stored within said validated display area and to compare check data dependent upon said displayed data with said validation data to confirm said displayed data matches said subject image.

Viewed from a further aspect the present invention provides a method of processing data comprising the steps of:

operating processing circuitry in a selectable one of a secure domain and a non-secure domain;

storing secure data within a secure region of a memory and storing non-secure data within a non-secure region of said memory, said secure data being accessible to said processing circuitry when operating in said secure domain and being non-accessible to said processing circuitry when operating in said non-secure domain, and said non-secure data being accessible to said processing circuitry when operating in said secure domain and being accessible to said processing circuitry when operating in said non-secure domain;

receiving user input data; and displaying a display image in dependence upon a frame of image data read from a frame buffer stored within said non-secure region; wherein when said processing circuitry is operating in said secure domain, storing a subject image comprising at least a portion of said frame of image data within a validated display area of said frame buffer and storing within said secure region validation data dependent upon said subject image; and when said processing circuitry is operating in said secure domain, receiving a user input from said user input device and, upon receipt of said user input, reading displayed data stored within said validated display area and comparing check data dependent upon said displayed data with said validation data to confirm said displayed data matches said subject image.

The above, and other objects, features and advantages of this invention will be apparent from the following detailed description of illustrative embodiments which is to be read in connection with the accompanying drawings.

DESCRIPTION OF THE EMBODIMENTS

Figure 1:
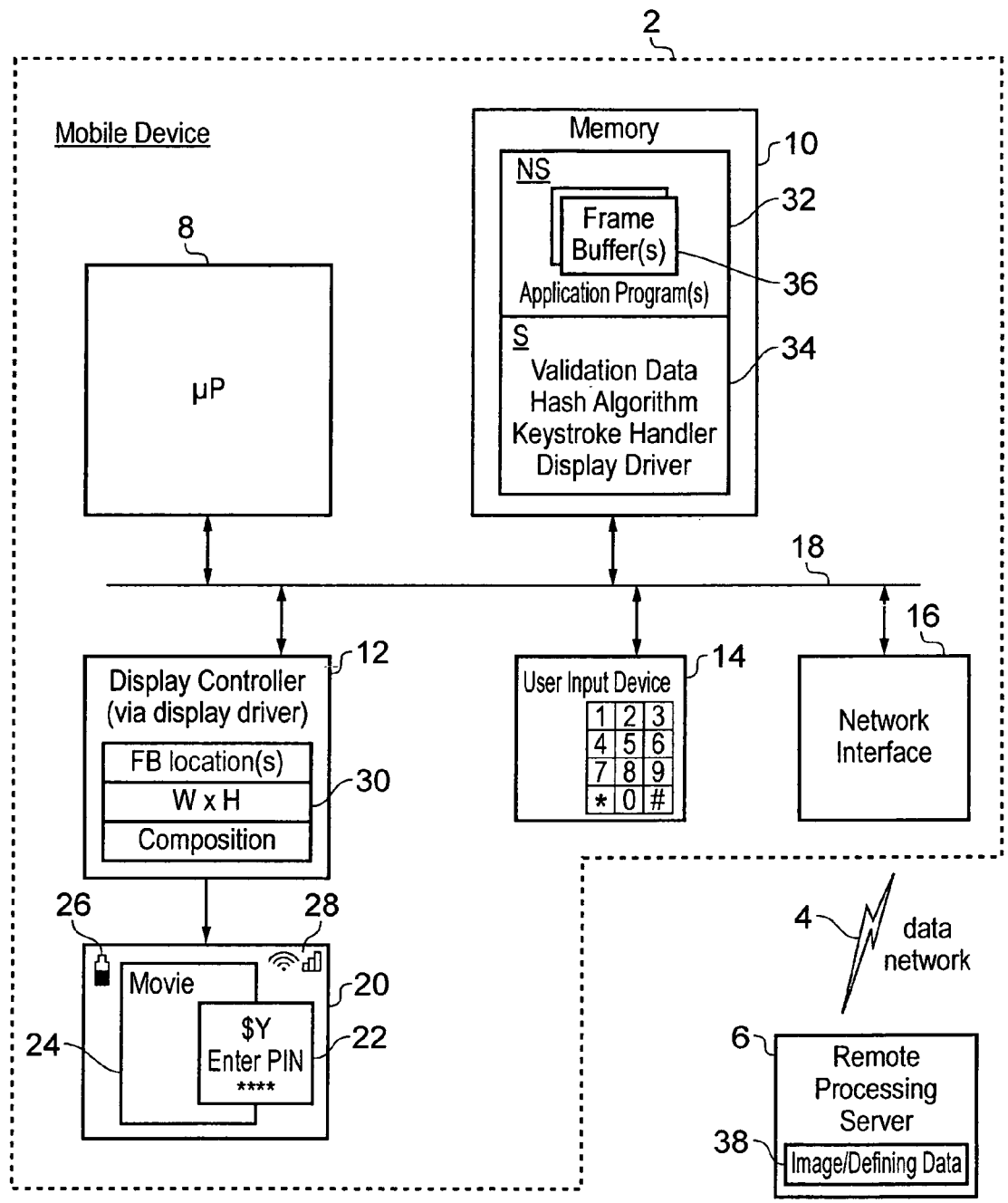
FIG. 1 schematically illustrates a mobile data processing device having a display for displaying a subject image and coupled to a remote processing server.

FIG. 1 schematically illustrates a mobile data processing apparatus 2, such as a mobile telephone, coupled via a data network 4, such as a wireless network, to a remote processing server 6, such as a bank server.

The mobile data processing device 2 includes a processor core 8, a memory 10, a display controller 12, a user input device 14 and a network interface 16 all connected via a system bus 18. The display controller 12 drives a display image 20, for example on an LCD display, to show a display which includes a subject image 22 displayed within a validated display area and specifying details of a bank transaction to be authorised. The subject image 22 may be, for example, prompting the user to enter their PIN or their password and displaying to the user details of the transaction concerned, such as the value of the transaction and/or the recipient of the transaction. The display image 20 may also include non-secure elements, such as a window of movie data 24, a battery state indicator 26 and network connection indicators 28 all controlled by non-secure software.

The display controller 12 includes configuration registers 30 storing display configuration data such as data specifying the location (start memory address within the memory 10) of one or more frame buffers 36 to be used by the display controller, size parameters of the display image 20, composition parameters specifying how the display image 20 is to be composed from data stored within a plurality of frame buffers 36 (e.g. windowing parameters, layering parameters, transparency parameters, resolution parameters etc).

The memory 10 stores data to be accessed by the processor core 8 and the display controller 12. The memory 10 includes a non-secure region 32 and a secure region 34. The one or more frame buffers 36 and application programs for performing non-secure processing operations are stored within the non-secure region 32. The secure region 34 stores validation data, a hash algorithm, a keystroke interrupt handler and display driver software. The processor core 8 serves as processing circuitry and executes a stream of program instructions. The processor core 8 operates in a selectable one of a secure domain and a non-secure domain. These are hardware domain states of the processor core 8 and each domain may include multiple modes of operation, such as a user mode, a system mode, a privileged mode, a hypervisor mode etc. Examples of a system providing a secure domain and a non-secure domain are the TrustZone enabled processors produced by ARM Limited of Cambridge, England. When operating in the non-secure domain, the software interacts with the screen directly or through non-secure driver code. When operating in the secure domain the processor core 8 may read and write data which is stored within both the secure region 34 and the non-secure region 32. When operating in the non-secure domain the processor core 8 may read and write data stored within the non-secure region 32, but may not read or write data stored within the secure region 34. The display controller 12 may access data stored within the non-secure region 32, but may not access data stored within the secure region 34. Thus, the frame buffers 36 are stored within the non-secure region 32.

The user input device 14 is a keypad for inputting keystrokes. When a keystroke is entered via the user input device 14, an interrupt signal is generated which triggers the processor core 8 to execute interrupt handling code associated with keystroke entry without the non-secure operating environment having a chance to react to the keystroke. This interrupt handling code is a keystroke handler stored within the secure region 34. Since the keystroke handler is stored within the secure region 34, it is protected against malicious alteration and is trusted.

When validating keystrokes, as will be described later, from within the secure domain it is appropriate to read display configuration parameters from the display controller 12 and accordingly secure display driver code is stored within the secure region 34 such that its security may be assured.

The secure region 34 also stores a hash algorithm for generating validation data to be stored within a secure region when the subject image 22 is written to the frame buffers 36. The hash algorithm can be used again when a keystroke is received to check that the displayed data within the secure area at which the subject image was displayed still matches the subject image by generating check data from the display data and comparing this with the validation data previously stored within the secure region. The secure region 34 will also store data indicating the location and composition parameters within the display image 20 of the validated display area in which the subject image 22 is displayed.

The remote processing server 6, such as a bank server, requests via the data network 4 that the mobile device 2 displays the subject image 22 in order to prompt the user to enter an authentication code, such as a PIN number or a password, which will authenticate a transaction being controlled. The remote processing server 6 may provide subject image defining data 38 via the data network 4 to the mobile device 2 to be used by code executing within the secure domain to generate the subject image 22 with a form representing the transaction to be authenticated. The subject image defining data may, for example, be PNG data or HTML data specifying parameters such as the value of a transaction, the parties to the transaction, what type of authentication is required etc.

FIG. 1 shows an example embodiment in the form of a mobile device, such as a mobile telephone. Other embodiments, such as a set top box for receiving television signals are also possible.

Figure 2:
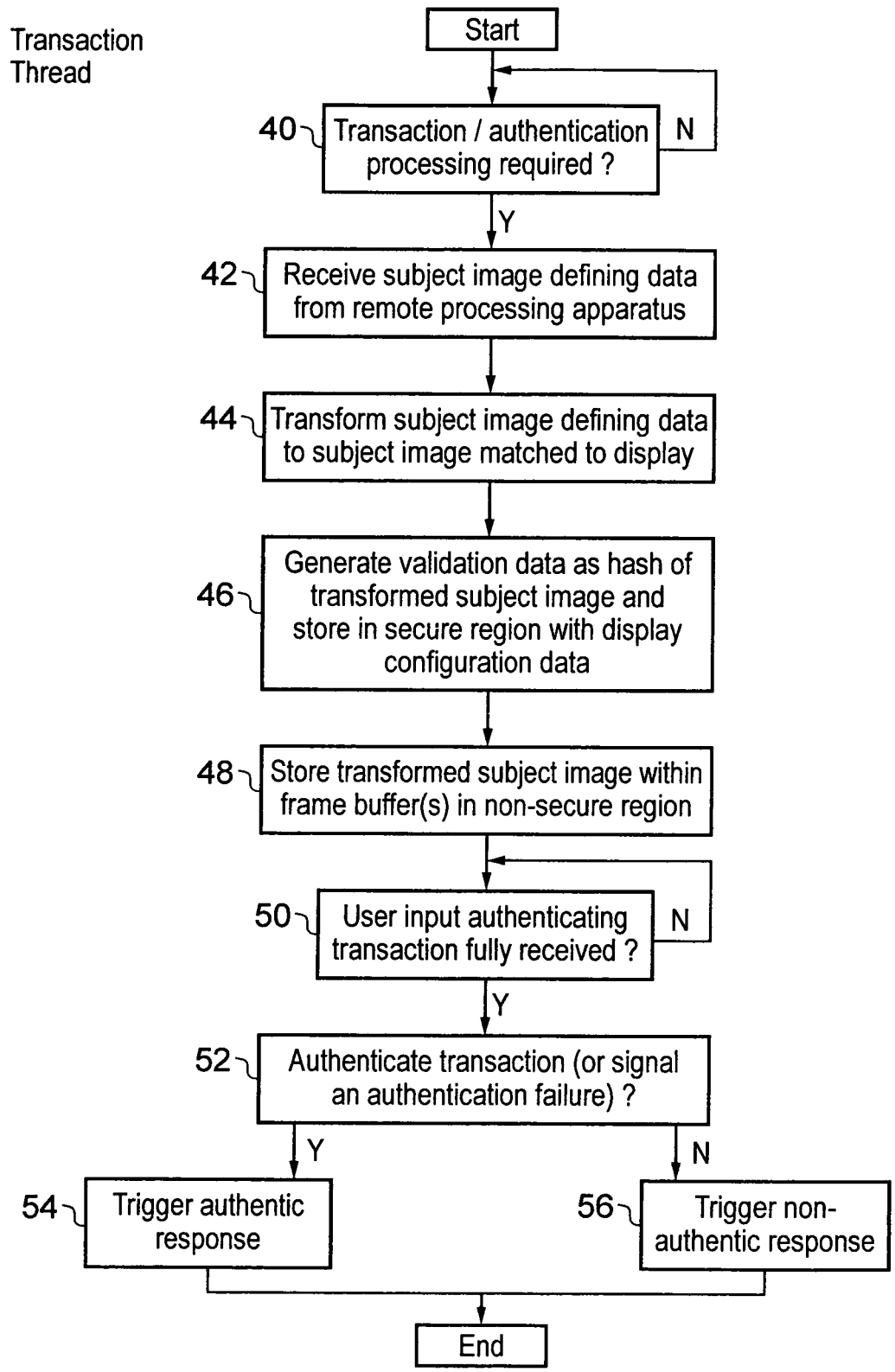
FIG. 2 is a flow diagram schematically illustrating processing associated with a transaction processing thread within a multiprocessing environment.

FIG. 2 is a flow diagram schematically illustrating the processing associated with a transaction thread in accordance with the present techniques. It will be appreciated that within a processing environment a plurality of processing threads may be active concurrently. The processor core 8 may switch back and forth between the secure domain and the non-secure domain in servicing these different processing threads. The present technique encompasses these possibilities and it may be that the processing described to check a subject image is temporarily interrupted while another thread is executed before the check processing is resumed. Such switching does not provide data that would enable non-secure activities to react to the input event.

At step 40 the processing thread waits until a transaction requiring authentication processing is received. At step 42 the mobile device 2 receives from the remote processing server 6 the subject image defining data 38 via the data network 4. At step 44 the subject image defining data 38 is transformed into the subject image 22 which is matched to the characteristics of the display 20. As an example, the subject image defining data may be PNG data and the subject image may be JPEG data sized and configured to have a form suitable for display within the display image 20. The transformation may also serve to ensure the subject image will completely fill the validated display area, e.g. by scaling, padding to ensure no empty/void areas etc.

At step 46 the hashing algorithm generates validation data for the transformed subject image 22 in the form of a validation hash value and stores this validation hash value within the secure region 34. At the same time, display configuration data 30 read from the display controller 12 is stored within the secure region 34. At step 48 the transformed subject image 22 is written to the validated display area (corresponding to the outline of the subject image 22 in FIG. 1) within the frame buffers 36 stored inside the non-secure region 32. At step 50 the processing thread waits until the required user input for authenticating a transaction is fully received, e.g. if a four digit PIN number is expected, then the processing thread waits until four digits have been received or if a password is expected then the processing thread waits until a return input is received. At step 52 an authentication operation is performed upon the fully received user input. If authentication is passed then step 54 triggers an authentic response whereas if authentication is failed then step 56 triggers a non-authentic response (including signalling an authentication failure).

It will be appreciated that all of the processing steps illustrated in FIG. 2 is performed by the processor core 8 operating in the secure domain in which it can access data both within the secure region 34 and within the non-secure region 32.

Figure 3:
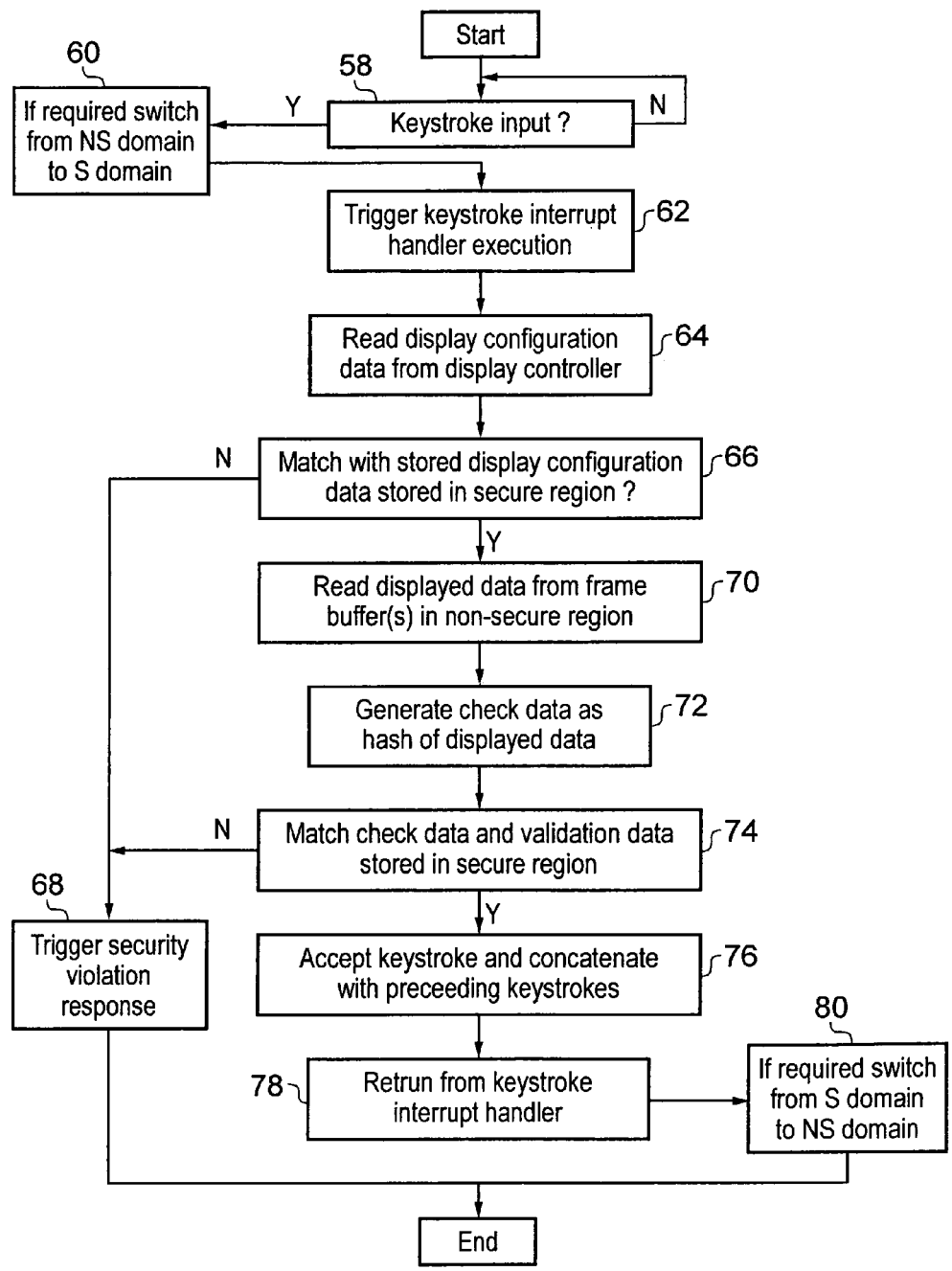
FIG. 3 is a flow diagram schematically illustrating the flow of control and processing associated with receipt of a user input in the form of a keystroke.

FIG. 3 schematically illustrates the hardware and software processing and flow of control performed upon receipt of a keystroke user input. At step 58 processing waits until a keystroke input is received. When a keystroke input is received, step 60 switches from the non-secure domain to the secure domain. If the system is already in the secure domain, then this step may be bypassed. Step 62 triggers execution of a keystroke interrupt handler stored within the secure region 34. Step 64 reads the display configuration data from the display controller 12. Step 66 compares the display configuration data read at step 64 with display configuration data previously stored within the secure region 34 at the time at which the subject image 22 was written to the frame buffer 36 to determine if it has been changed in an unacceptable manner. If there is not a match, then the security violation response, such as generation of a warning message, aborting of the transaction, locking of the mobile device 2, etc is performed at step 68.

If the determination at step 66 is that the stored display configuration data and the read display configuration data match, then processing proceeds to step 70 at which the displayed data is read from within the frame buffer 36 at the validated display area to which the subject image 22 was originally written. This displayed data is subject to the hash algorithm at step 72 to generate a check hash value. The hash algorithm is performed by program code executed by the processor core 8 with the program code being stored within the secure region 34. Step 74 compares the check hash value with the validation hash value stored at step 46 of FIG. 2. If there is no match between the check hash value and the validation hash value, then the security violation response is again triggered at step 68. If there is a match between the check hash value and the validation hash value at step 74, then step 76 serves to accept the keystroke concerned and concatenate this keystroke with any preceding keystrokes. Step 78 then returns processing from the keystroke interrupt handler and step 80 performs any switch back from the secure domain to the non-secure domain if the system was originally operating in the non-secure domain.

It will be appreciated that a copy of the transformed subject image could, in other embodiments, be stored in the secure region 34 and this copy compared with the displayed data directly to ensure the displayed data had not been changed. This would not require the use of the hash algorithm.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
    processing circuitry configured to operate in a selectable one of a secure domain and a non-secure domain;
    a memory coupled to said processing circuitry and configured to store secure data within a secure region of said memory and to store non-secure data within a non-secure region of said memory, said secure data being accessible to said processing circuitry when operating in said secure domain and being non-accessible to said processing circuitry when operating in said non-secure domain, and said non-secure data being accessible to said processing circuitry when operating in said secure domain and being accessible to said processing circuitry when operating in said non-secure domain;
    a user input device coupled to said processing circuitry and configured to receive user input data; and
    a display coupled to said processing circuitry and configured to display a display image in dependence upon a frame of image data read from a frame buffer stored within said non-secure region; wherein
    said processing circuitry is configured to operate in said secure domain to store a subject image comprising at least a portion of said frame of image data within a validated display area of said frame buffer and to store within said secure region validation data dependent upon said subject image; and
    said processing circuitry is configured to operate in said secure domain to receive a user input from said user input device and, upon receipt of said user input, to read displayed data stored within said validated display area and to compare check data dependent upon said displayed data with said validation data to confirm said displayed data matches said subject image.

2. Apparatus as claimed in claim 1, wherein said user input device is configured such that when a user generates a user input, if said processing circuitry is operating in said non-secure domain, then said processing circuitry is switched to operate in said secure domain.

3. Apparatus as claimed in claim 1, wherein when said processing circuitry is operating in said secure domain, said processing circuitry polls said user input device to determine if any user input has been received.

4. Apparatus as claimed in claims 1, wherein said validation data is a validation hash value generated by a hash algorithm operating upon said subject image and said check data is check hash value generated by said hash algorithm operating upon said displayed data.

5. Apparatus as claimed in claim 1, wherein said validation data is said subject image and said check data is said displayed data.

6. Apparatus as claimed in claim 1, comprising a display controller coupled to said display and to said memory and configured to read said frame of image data from said memory and to control said display to display said display image in dependence upon said frame of image data, wherein said display controller is configured by display configuration data specifying at least a storage location within said memory of said frame buffer.

7. Apparatus as claimed in claim 6, wherein said processing circuitry is configured, upon said receipt of said user input, to read said display configuration data to confirm said storage location has not changed in an unacceptable manner since said subject image was stored within said validated display area.

8. Apparatus as claimed in claim 7, wherein said display configuration data also specifies size parameters of said display image and said processing circuitry is configured, upon said receipt of said user input, to read said display configuration data to confirm said size parameters have not changed in an unacceptable manner since said subject image was stored within said validated display area.

9. Apparatus as claimed in claim 7, wherein said memory stores a plurality of frame buffers and said display configuration data also specifies composition parameters of said display image controlling how said display image is composed from data stored within said plurality of frame buffers and said processing circuitry is configured, upon said receipt of said user input, to read said display configuration data to confirm said composition parameters have not changed in an unacceptable manner since said subject image was stored within said validated display area.

10. Apparatus as claimed in claim 1, wherein said apparatus is connected via a data network to a remote processing apparatus and said subject image is dependent upon subject image defining data received from said remote processing apparatus.

11. Apparatus as claimed in claim 10, wherein, when operating in said secure domain, said processing circuitry transforms said subject image defining data received from said remote processing apparatus to generate said subject image in a form matched to said display.

12. Apparatus as claimed in claim 10, wherein if said comparison of said check data with said validation data indicates said displayed data does match said subject image, then said processing circuitry returns a match confirmation indication to said remote processing apparatus via said data network.

13. Apparatus as claimed in claim 1, wherein said subject image is dependent upon subject image defining data stored within said apparatus and verified as unmodified by said processing circuitry operating in said secure domain.

14. Apparatus as claimed in claim 1, wherein said user input device is a key-operated user input device configured to capture keystrokes entered by a user and said processing circuitry is configured upon capture of each keystroke entered by said user to read said displayed data stored within said validated display area, to generate said check data dependent upon said displayed data and to compare said check data with said validation data to confirm said displayed data matches said subject image.

15. Apparatus as claimed in claim 14, wherein said key-operated user input device is configured to generate an interrupt signal upon capture of a keystrokes, said interrupt signal triggering execution of an interrupt handling routine by said processing circuitry operating within said secure domain, said interrupt handling routine at least triggering said processing circuitry to generate said check data dependent upon said displayed data and to compare said check data with said validation data to confirm said displayed data matches said subject image.

16. Apparatus as claimed in claim 1, wherein, if said comparison of said check data with said validation data indicates said displayed data does not match said subject image, then said processing circuitry triggers a security violation response and if said comparison of said check data with said validation data indicates said displayed data does match said subject image, then said processing circuitry permits a continuation of a secure processing operation.

17. Apparatus as claimed in claim 1, comprising a plurality of frame buffers each storing a frame of image data, at least one of said frames of image data including said subject image, wherein said display image is dependent upon said plurality of frames of image data.

18. Apparatus as claimed in claim 1, wherein said subject image indicates one or more transaction parameters of a transaction to be authenticated and said user input is an authentication input for authenticating said transaction.

19. Apparatus as claimed in claim 18, wherein said authentication input is one of a personal identification number and a password.

20. Apparatus as claimed in claim 1, wherein said apparatus is one of a mobile data processing apparatus and a set top box configured to receive television signals.

21. Apparatus as claimed in claim 1, wherein said subject image fills said validated display area.

22. Apparatus for processing data comprising:
processing means for performing processing in a selectable one of a secure domain and a non-secure domain;
memory means for storing data, said memory means being coupled to said processing circuitry and configured to store secure data within a secure region of said memory and to store non-secure data within a non-secure region of said memory means, said secure data being accessible to said processing means when operating in said secure domain and being non-accessible to said processing means when operating in said non-secure domain, and said non-secure data being accessible to said processing means when operating in said secure domain and being accessible to said processing means when operating in said non-secure domain;
user input means for receiving a user input data, said user input means being coupled to said processing means; and
display means for displaying a display image, said display means being coupled to said processing means and configured to display said display image in dependence upon a frame of image data read from a frame buffer stored within said non-secure region; wherein
said processing means is configured to operate in said secure domain to store a subject image comprising at least a portion of said frame of image data within a validated display area of said frame buffer and to store within said secure region validation data dependent upon said subject image; and
said processing means is configured to operate in said secure domain to receive a user input from said user input means and, upon receipt of said user input, to read displayed data stored within said validated display area and to compare check data dependent upon said displayed data with said validation data to confirm said displayed data matches said subject image.

23. A method of processing data comprising the steps of:
operating processing circuitry in a selectable one of a secure domain and a non-secure domain;
storing secure data within a secure region of a memory and storing non-secure data within a non-secure region of said memory, said secure data being accessible to said processing circuitry when operating in said secure domain and being non-accessible to said processing circuitry when operating in said non-secure domain, and said non-secure data being accessible to said processing circuitry when operating in said secure domain and being accessible to said processing circuitry when operating in said non-secure domain;
receiving user input data; and
displaying a display image in dependence upon a frame of image data read from a frame buffer stored within said non-secure region; wherein
when said processing circuitry is operating in said secure domain, storing a subject image comprising at least a portion of said frame of image data within a validated display area of said frame buffer and storing within said secure region validation data dependent upon said subject image; and
when said processing circuitry is operating in said secure domain, receiving a user input from said user input device and, upon receipt of said user input, reading displayed data stored within said validated display area and comparing check data dependent upon said displayed data with said validation data to confirm said displayed data matches said subject image.

* * * * *